March 13, 1962  C. E. LEJA  3,025,032
FLEXIBLE SEAT SUPPORT
Filed May 6, 1959  2 Sheets-Sheet 2

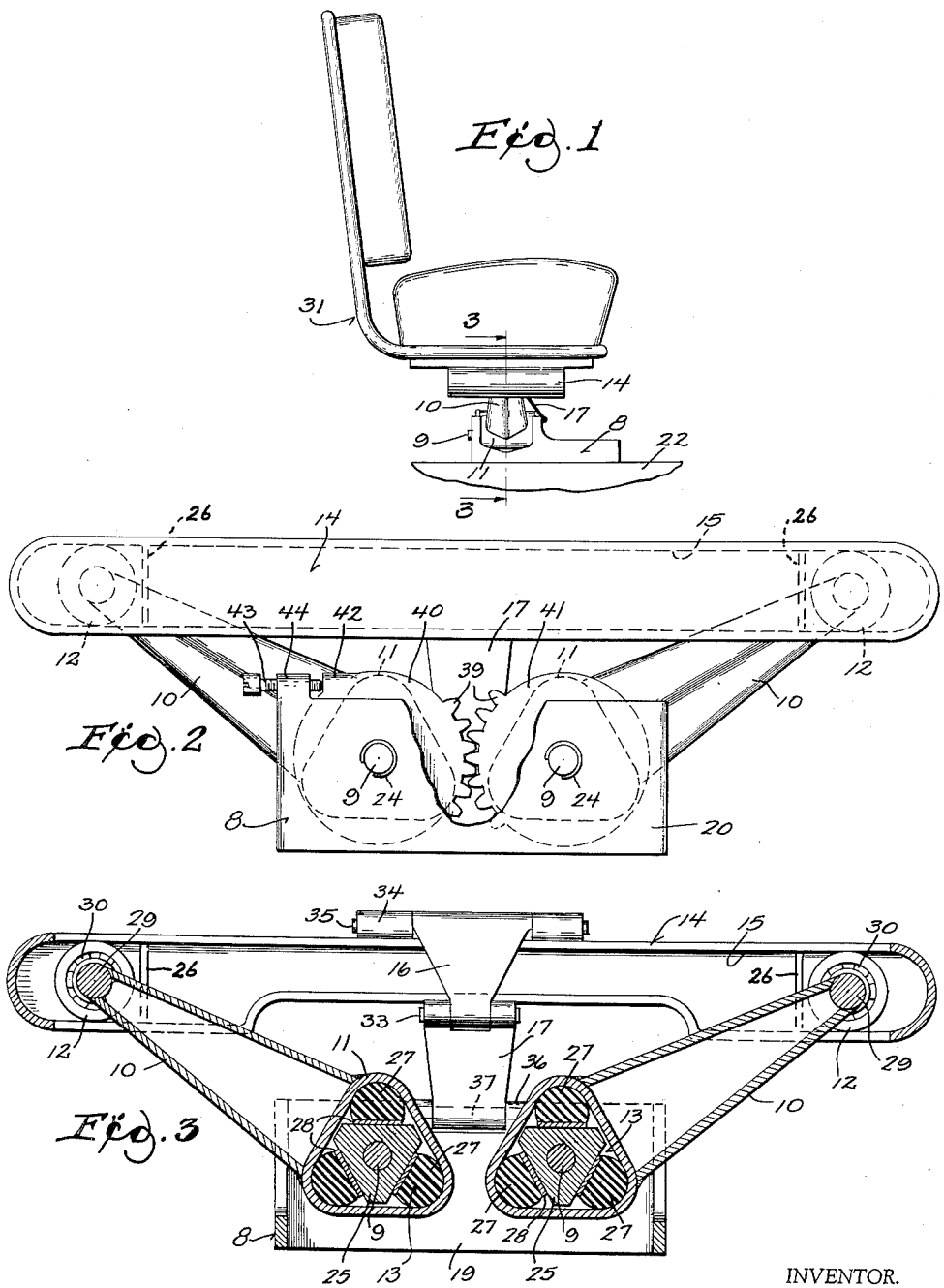

INVENTOR.
CASIMIR E. LEJA
BY
Lieber, Lieber & Nilles
ATTORNEYS even# United States Patent Office 3,025,032
Patented Mar. 13, 1962

3,025,032
FLEXIBLE SEAT SUPPORT
Casimir E. Leja, Minooka, Ill., assignor, by mesne assignments, to Komfort King Seats, Inc., a corporation of Illinois, as trustee
Filed May 6, 1959, Ser. No. 811,333
5 Claims. (Cl. 248—399)

The present invention relates generally to improvements in the art of mounting seats upon carriers which are subject to considerable jarring and vibration, and it relates more specifically to improvements in the construction and operation of seat supports especially adapted for use on relatively rough riding vehicles such as tractors, road building equipment, or the like.

The primary object of this invention is to provide an improved flexible support for seats which are carried by structures frequently subjected to sudden jarring and jolting, and which most effectively adjusts itself so as to enhance the comfort of the seat occupant.

Some of the more important objects of the invention are as follows:

To provide an improved simple but durable seat assemblage especially adapted for use on vehicles which are normally utilized to travel over rough and uneven terrain, and which functions to automatically absorb shock and to compensate for annoying movements to which the seat may be subjected during normal use.

To provide a flexible mounting for seats which are subject to occupant annoying displacement derived from the seat carriers, which may be conveniently adjusted by the occupant to vary the load carrying ability and comfort of the support.

To provide an improved dual suspension for vehicle seat supports embodying resilient mountings of the type forming the subject of prior United States Patent No. 2,856,982 granted October 21, 1958, which will effectively absorb tilting tendency and provide self-leveling to a degree, thus permitting the occupant to remain in a near perpendicular position even when traveling over rough ground.

To provide a comfortable seat support which is advantageously applicable as an accessory to various types of vehicles either as original equipment or in replacement of inferior existing seating units.

To provide a resilient seating unit applicable to rough riding vehicles to convert the seats thereof into comfortable supports for the vehicle occupants, and which may be produced and installed at moderate cost.

These and other more specific objects and advantages of the invention will be apparent from the following detailed description.

A clear conception of the several features constituting the present improvement, and of the construction and functioning of a typical commercial seat unit embodying the invention, may be had by referring to the drawing accompanying and forming a part of this specification wherein like reference characters designate the same or similar parts in the various views.

FIGURE 1 is a side view of a flexible seat support having a seat secured thereto and being mounted upon a fragment of a carrier vehicle;

FIGURE 2 is an enlarged rear view of the improved seat support alone, with a portion of the rear wall of the frame broken away to reveal normally hidden structure;

FIGURE 3 is a similarly enlarged transverse vertical section through the seat support alone, taken along the line 3—3 of FIGURE 1;

Figure 4:
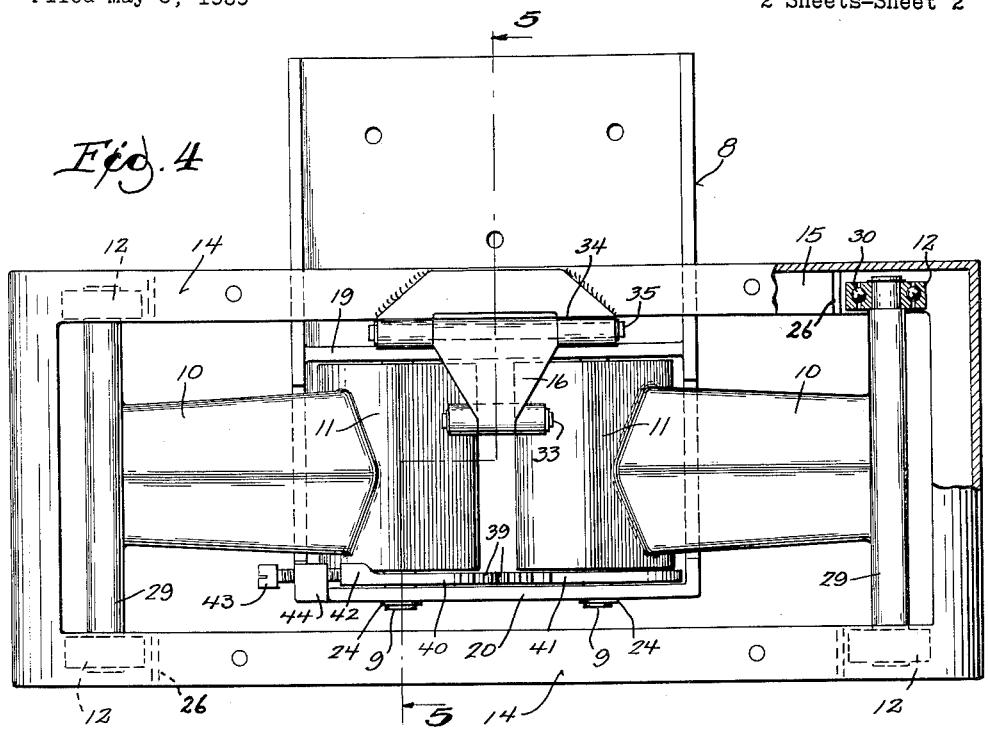
FIGURE 4 is a likewise enlarged top view of the seat support with the seat removed, and a corner of the platform broken away.

While the invention has been shown and described herein as having been embodied in a typical truck seat assemblage including a cushion seat and shock absorbing means such as shown in the prior patent hereinabove referred to, it is not intended to limit the use of all of the improved features to such seats and shock absorbers; and it is also contemplated that specific descriptive terms employed herein be given the broadest possible interpretations consistent with the actual dislosure.

Referring to the drawings, the improved flexible seat support shown therein, comprises in general main frame 8 having spaced shafts 9 mounted thereon; a pair of upwardly and oppositely inclined arms 10 each having an integral casing 11 at one end surrounding one of the pivots 9 and also having its opposite swinging end provided with at least one roller 12; a shock absorbing assemblage 13 interposed between each of the casings 11 and the adjacent pivot 9; a seat carrying platform 14 having a guideway 15 therein with which the rollers 12 coact; and a centralizing toggle including a pair of links 16, 17 interconnecting the platform 14 and frame 8 independently of the arms 10.

Figure 5:
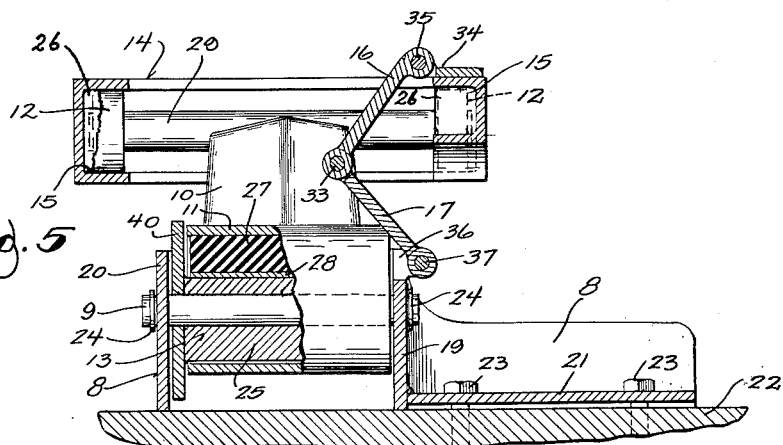
FIGURE 5 is a similarly enlarged central vertical section through the seat supporting frame and platform centralizing toggle, and an off-set vertical section through one of the shock absorbing assemblages, taken along the irregular line 5—5 of FIGURE 4.

The main frame 8 may be of rigid unitary construction having front and rear upright walls 19, 20 respectively and a base 21 formed integral with one of these walls and adapted to be firmly attached to a portion 22 of the carrying vehicle by means of bolts or screws 23 as shown in FIGURE 5. The shafts 9 are preferably disposed parallel to each other and have their opposite ends carried in the frame walls 19, 20 and they may either be provided with clips 24 coacting with grooves in the shaft ends to prevent longitudinal displacement or they may be in the form of bolts. Triangular or otherwise polygonal metal blocks 25 are mounted on the pivot shafts 9 within the likewise polygonal shaped casings 19 of the adjacent arms 10, the blocks 25 being secured, as by welding, to disks 40, 41 as will hereafter appear; and a resilient compression member 27 formed of rubber or the like is interposed between a corner of the adjacent casing 11 and the corresponding flat outer face of the confined block 25. To complete each shock absorbing assemblage, a metal plate 28 is bonded to a flat formed on each member 27, and coacts with the adjacent flat face of the corresponding block 25, as shown in FIGURES 3 and 5.

The seat carrying platform 14 is of rigid unitary construction and of approximately rectangular shape, with its front and rear portions of channel shaped cross-section to produce the parallel horizontal front and rear guideways 15, each of which is provided with stops 26 secured therein and limiting movement of the rollers 12 as well as upward movement of the arms 10. The upwardly and outwardly inclined radius arms 10 are also of durable construction; and besides having the casings 11 formed integral with their pivoted ends, these arms 10 have their outer swinging ends provided with integral rigid transverse extensions 29 which span the space between the opposed guideways 15 of the platform 14 and have their outer ends provided with anti-friction bearings 30 upon which the rollers 12 which coact with these guideways are journalled. The channel shaped cross-section of the platform provides a strong support to which seats 31 of various types may be firmly attached in any suitable manner in order to complete the seat assemblage as shown in FIGURE 1.

The centralizing toggle links 16, 17 are articulably united by a pivot pin 33, and the upper link 16 is swingably attached to a bracket 34 firmly secured to the front cross-bar of the platform 14 by a pivot pin 35, while the lower link 17 is likewise swingably attached to lugs 36 firmly secured to the front wall 19 of the frame 8 by still another pivot 37, as shown in FIGURES 3, 4 and 5. This toggle serves to centralize the platform 14 with respect to the frame 8, and the links are preferably formed of resilient material such as spring steel to permit the toggle to flex and allow some transverse or lateral movement of the platform 14 during extreme tilting of the vehicle; and the toggle is also preferably formed to deflect inwardly relative to the frame 8 in order to avoid interfering with an occupant of the seat.

In order to permit effective adjustment of the degree of flexibility of the seat support, a pair of disks 40, 41 having local intermeshing gear teeth 39 on their peripheries are attached to the respective triangular blocks 25 as by welding, the disks 40, 41 being rotatable about the shafts 9. The disks 40, 41 provide mutilated gears which when rotated will revolve both of the blocks 25 simultaneously but in opposite directions about the axes of the two shafts 9 and relative to the respective casings 11, and in order to permit these disks to be rotated the disk 40 is provided with a peripheral abutment 42 with which a set screw 43 adjustable within another lug 44 on the rear wall 20 of the frame 8 coacts. By manipulating this set screw the disks 40, 41 are revolved carrying with them the triangular blocks 25 and varying the compression of the resilient members 27 thereby varying the degree of flexibility of the seat support.

When the improved seat mounting assemblage has been properly assembled and applied to a carrier 22 as above described, its operation is substantially as follows. The set screw 43 should be adjusted to accommodate the weight of the intended seat occupant and provide him with the desired degree of flexibility. Then as the vehicle with which the seat is associated, advances along rough terrain the shock absorbers comprising the shafts 9, casings 11, blocks 25, flexible members 27, and the bearing plates 28 function to permit the arms 10 to swing and the platform 14 and the seat 31 to move transversely or laterally to a degree so as to maintain a reasonably constant horizontal or level position. The toggle formed by the links 16, 17 functions to more or less centralize the platform but should be flexible enough to permit some lateral displacement, and the rollers 12 will ride along the guideways 15 of the platform so as to insure a smooth transmission of motion from the arms 10 to the platform 14 while also eliminating excessive wear.

From the foregoing detailed description it will be apparent that the present invention in fact provides a flexible and resilient seat support, which when properly applied and adjusted, functions to automatically absorb shock and vibration applied to the frame 8 by the carrying vehicle. The assemblage is highly flexible in its adaptation, and may be applied to various types of vehicles or carriers while also having different types of seats associated therewith. The several parts of the assemblage should be durably constructed, and aside from having the various bearings occasionally oiled, requires little attention. The sturdy box-like main frame effectively protects the various working parts against possible damage, and the shock absorbers and the toggle cooperate with the disks 40, 41 to insure maximum comfort for the occupant of the seat 31.

It should be understood that it is not desired to limit this invention to the exact details of construction or to the precise functioning of the dual seat support herein shown and described, for various modifications within the scope of the appended claims may occur to persons skilled in the art.

I claim:
1. A seat support comprising, a frame having spaced parallel shafts mounted thereon, upwardly and outwardly inclined arms each having a casing at one end surrounding one of said shafts and also having its opposite end provided with a roller, a shock absorber interposed between each of said casings and the adjacent shaft, a seat carrying platform having a guideway with which said rollers coact, a toggle connecting said platform and said frame independently of said arms, said toggle being swingable in a plane transverse to the plane of the swinging movement of said arms and adjustable means cooperating with said shafts to simultaneously vary the action of said shock absorbers.

2. A seat support comprising, a frame, a pair of laterally spaced outwardly and upwardly inclined arms swingably suspended from said frame, a roller mounted upon the swinging end of each of said arms, a seat carrying platform having guiding means with which said rollers coact, and a flexible platform centralizing member extending between said arms and connecting adjacent medial portions of said platform and said frame independently of said arms for operation solely in a direction transverse to the direction of swinging movement of said arms.

3. A seat support comprising, a frame, a pair of laterally spaced outwardly and upwardly inclined arms swingably suspended from said frame, a roller mounted upon the swinging end of each of said arms, a seat carrying platform having guiding means with which said rollers coact, and a platform centralizing toggle extending upwardly between said arms with the opposite ends thereof connecting adjacent medial portions of said platform and said frame independently of said arms for operation solely in a direction transverse to the direction of swinging movement of said arms.

4. A seat support comprising, a frame, a pair of laterally spaced outwardly and upwardly inclined arms swingably suspended from said frame, each of said arms having a transverse shaft at the upper swinging end thereof, a pair of rollers mounted on the ends of each of said shafts, a seat carrying platform having laterally spaced guideways receiving said rollers for movement therein, and a platform centralizing toggle extending upwardly between said arms with the opposite ends thereof hingedly connected to adjacent medial portions of said platform and said frame independently of said arms for operation solely in a direction transverse to the direction of swinging movement of said arms.

5. A seat support comprising, a frame having spaced parallel shafts mounted thereon, upwardly and outwardly inclined arms each having a casing at one end surrounding one of said shafts and also having its opposite end provided with a roller, a shock absorber interposed between each of said casings and the adjacent shaft, a seat carrying platform having a guideway with which said rollers coact for relative movement, and a platform centralizing toggle extending upwardly entirely between said shafts and having its opposite ends connected to corresponding medial portions of said platform and said frame independently of said arms for operation in a direction transverse to the direction of swinging movement of said arms while maintaining said platform centralized with respect to said frame.

References Cited in the file of this patent
UNITED STATES PATENTS

| | | |
|---|---|---|
| 1,734,776 | Pallenberg | Nov. 5, 1929 |
| 2,358,319 | Dupee | Sept. 19, 1944 |
| 2,691,406 | Hickman | Oct. 12, 1954 |
| 2,704,568 | Hickman | Mar. 22, 1955 |